(12) United States Patent
Dhamecha et al.

(10) Patent No.: US 10,984,672 B2
(45) Date of Patent: Apr. 20, 2021

(54) TUTORING AGENT IMPROVEMENT RECOMMENDATION

(71) Applicant: International Business Machines Corporation, Armonk, NY (US)

(72) Inventors: Tejas Indulal Dhamecha, Bangalore (IN); Renuka Sindhgatta, Bangalore (IN); Smitkumar Narotambhai Marvaniya, Bangalore (IN); G. Vinay Shashidhar, New Delhi (IN); Shazia Afzal, New Delhi (IN); Bikram Sengupta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 15/987,756

(22) Filed: May 23, 2018

(65) Prior Publication Data

US 2019/0362642 A1  Nov. 28, 2019

(51) Int. Cl.
 *G09B 7/04* (2006.01)
 *G06F 40/20* (2020.01)
 *G09B 19/00* (2006.01)

(52) U.S. Cl.
 CPC .............. *G09B 7/04* (2013.01); *G06F 40/20* (2020.01); *G09B 19/00* (2013.01)

(58) Field of Classification Search
 CPC ...................................................... G09B 7/04
 USPC ........................................................ 434/362
 See application file for complete search history.

(56) References Cited

U.S. PATENT DOCUMENTS

| 9,131,053 | B1 | 9/2015 | Tan et al. |
| 9,330,088 | B2 | 5/2016 | Fitterer et al. |
| 2014/0335497 | A1 | 11/2014 | Gal et al. |
| 2016/0026962 | A1 | 1/2016 | Shankar et al. |
| 2016/0189034 | A1 | 6/2016 | Shakeri et al. |
| 2016/0203726 | A1 | 7/2016 | Hibbs et al. |

FOREIGN PATENT DOCUMENTS

| CN | 105810034 A | 7/2016 |
| WO | WO2017018940 A1 | 2/2017 |

*Primary Examiner* — Kesha Frisby
(74) *Attorney, Agent, or Firm* — Ference & Associates, LLC

(57) ABSTRACT

One embodiment provides a method, including: receiving a plurality of transcripts, each transcript corresponding to an interaction between a student and a tutoring agent; identifying conversational patterns within the plurality of transcripts, the identified conversational patterns indicating a level of understanding regarding the interaction between the tutoring agent and the student, wherein the identifying comprises (i) identifying an exchange between the tutoring agent and the student, the exchange comprising a conversational turn by each of the tutoring agent and the student and (ii) classifying each of the conversational turns into a response type; determining, based upon the identified conversational patterns, a possible improvement to the tutoring agent, wherein the possible improvement is determined based upon the classified response types of each of (i) the tutoring agent and (ii) the student; and notifying a developer of the tutoring agent of the identified possible improvement.

19 Claims, 4 Drawing Sheets

TUTORING AGENT IMPROVEMENT RECOMMENDATION

BACKGROUND

When a user has a problem or question the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as text-based output. Digital or virtual assistants may include assistants that receive voice input, process the voice input, and then provide a responsive output, for example, by audio, by performing a function, or the like. Conversational agents provide a method for a user to receive assistance with a problem or query without interfacing with a human user. The conversational agents are programmed to process input and provide output responsive to the input in a manner similar to how another human would engage in the conversation.

One type of conversational agent is a tutoring agent. A tutoring agent is a conversational agent that assists a student in learning a topic. The tutoring agent may present questions or output to the student related to a particular topic, similar to a human tutor or teacher. The student can then respond to the query or output either by using voice input that may be converted to text or by providing text input to the tutoring agent, for example, using a user interface associated with the tutoring agent. The tutoring agent then processes the response provided by the student to evaluate or assess the student's understanding of the topic. The evaluation may include identifying that the student does not have a complete or accurate understanding of the topic. Therefore, the tutoring agent may provide additional output to assist in improving the student's understanding of the topic.

BRIEF SUMMARY

In summary, one aspect of the invention provides a method, comprising: receiving a plurality of transcripts, each transcript corresponding to an interaction between a student and a tutoring agent, wherein the tutoring agent comprises a conversational agent that assists the student in learning a topic; identifying conversational patterns within the plurality of transcripts, the identified conversational patterns indicating a level of understanding regarding the interaction between the tutoring agent and the student, wherein the identifying comprises (i) identifying an exchange between the tutoring agent and the student, the exchange comprising a conversational turn by each of the tutoring agent and the student and (ii) classifying each of the conversational turns into a response type; determining, based upon the identified conversational patterns, a possible improvement to the tutoring agent, wherein the possible improvement is determined based upon the classified response types of each of (i) the tutoring agent and (ii) the student; and notifying a developer of the tutoring agent of the identified possible improvement.

A further aspect of the invention provides an apparatus, comprising: at least one processor; and a computer readable storage medium having computer readable program code embodied therewith and executable by the at least one processor, the computer readable program code comprising: computer readable program code configured to receive a plurality of transcripts, each transcript corresponding to an interaction between a student and a tutoring agent, wherein the tutoring agent comprises a conversational agent that assists the student in learning a topic; computer readable program code configured to identify conversational patterns within the plurality of transcripts, the identified conversational patterns indicating a level of understanding regarding the interaction between the tutoring agent and the student, wherein the identifying comprises (i) identifying an exchange between the tutoring agent and the student, the exchange comprising a conversational turn by each of the tutoring agent and the student and (ii) classifying each of the conversational turns into a response type; computer readable program code configured to determine, based upon the identified conversational patterns, a possible improvement to the tutoring agent, wherein the possible improvement is determined based upon the classified response types of each of (i) the tutoring agent and (ii) the student; and computer readable program code configured to notify a developer of the tutoring agent of the identified possible improvement.

Another aspect of the invention provides a computer program product, comprising: a computer readable storage medium having computer readable program code embodied therewith, the computer readable program code executable by a processor and comprising: computer readable program code configured to receive a plurality of transcripts, each transcript corresponding to an interaction between a student and a tutoring agent, wherein the tutoring agent comprises a conversational agent that assists the student in learning a topic; computer readable program code configured to identify conversational patterns within the plurality of transcripts, the identified conversational patterns indicating a level of understanding regarding the interaction between the tutoring agent and the student, wherein the identifying comprises (i) identifying an exchange between the tutoring agent and the student, the exchange comprising a conversational turn by each of the tutoring agent and the student and (ii) classifying each of the conversational turns into a response type; computer readable program code configured to determine, based upon the identified conversational patterns, a possible improvement to the tutoring agent, wherein the possible improvement is determined based upon the classified response types of each of (i) the tutoring agent and (ii) the student; and computer readable program code configured to notify a developer of the tutoring agent of the identified possible improvement.

An additional aspect of the invention provides a method, comprising: receiving a plurality of interaction logs corresponding to interactions between a tutoring agent and at least one student, wherein the tutoring agent comprises a conversational agent that assists a student in learning a topic; identifying, from the plurality of interaction logs, at least one area for improvement for the tutoring agent, wherein the identifying comprises: extracting exchanges from the plurality of interaction logs, wherein an exchange comprises an output by the tutoring agent and a response by the at least one student; grouping the exchanges into groups of exchanges corresponding to an identified concept; analyzing the exchanges to identify patterns within the exchanges of the group between the tutoring agent and the at least one student, wherein the identified patterns indicate a response type of the student to an output of the tutoring agent; and correlating, based upon the indicated response type, the identified patterns with an area for improvement of the tutoring agent; providing the identified at least one area for improvement to a developer of the tutoring agent.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
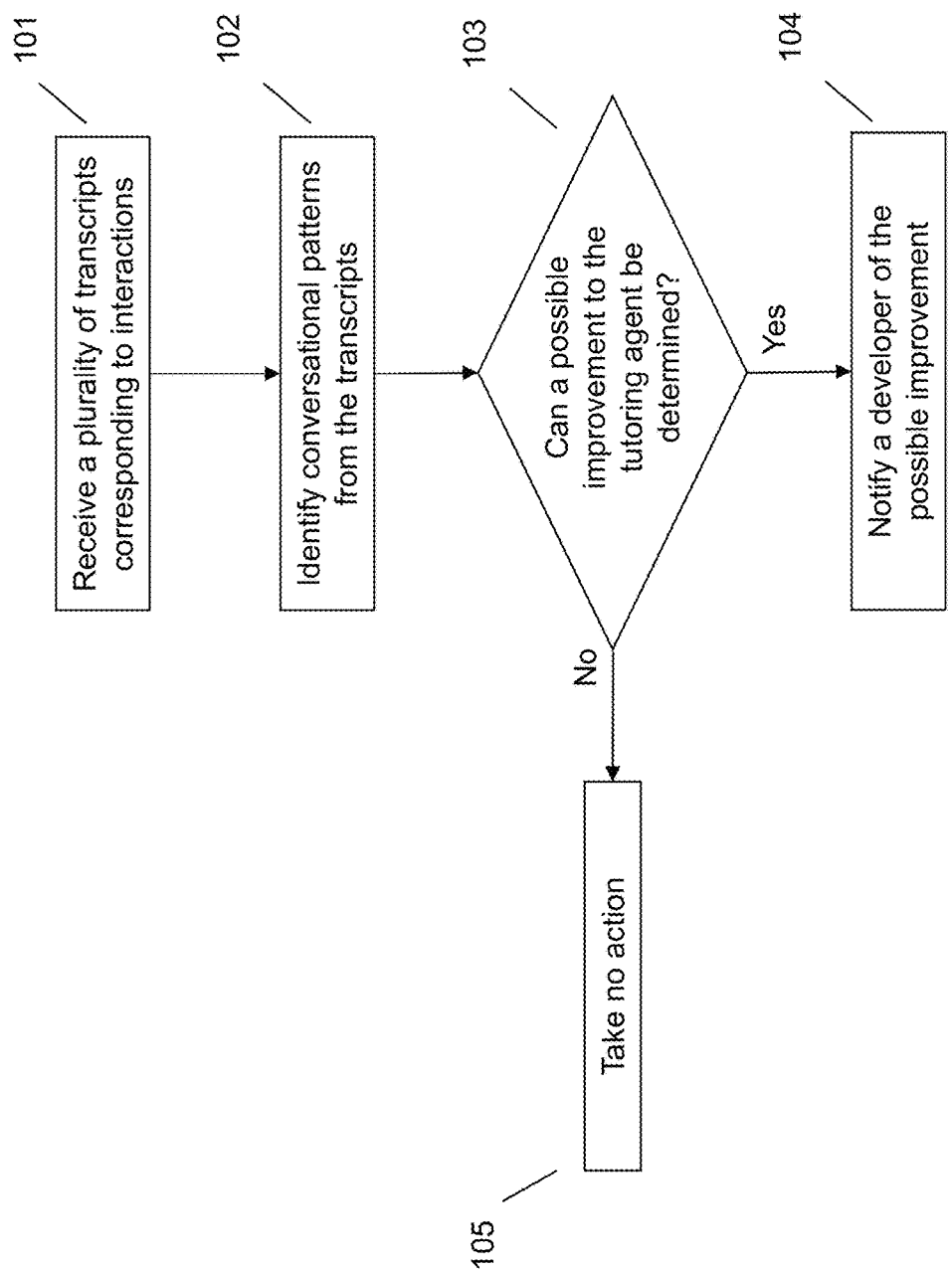
FIG. 1 illustrates a method of recommending an improvement to a tutoring agent based upon transcripts of interactions between the tutoring agent and students.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

When interfacing with a tutoring agent the tutoring agent provides natural language output and the student responds in kind. Thus, the tutoring agent's programming must convert the natural language input provided by the student to a format that is understandable by the tutoring agent, for example, a machine language. Thus, while tutoring agents are useful for assisting a student in learning a topic, the fact that the tutoring agent, like other conversational agents, has to convert the natural language input to a machine language without altering the meaning of the input results is difficult and may result in problems related to the tutoring agent understanding the intent of the user. In other words, it may be difficult for the tutoring agent to convert the natural language input to a machine language while still maintaining the meaning and intent of the received input.

This is particularly relevant in conjunction with a tutoring agent, where a student can provide responsive input in a variety of formats. Since the input can be received in different formats, it is difficult to program the tutoring agent in such a way that the tutoring agent will have a perfect understanding of every input that could be provided by a student. For example, the student may correctly answer a question provided by the tutoring agent but provides the answer in such a way that the tutoring agent identifies the answer as incorrect. As another example, the student can respond to a question posed by the tutoring agent with a question, which may be an unexpected response from the perspective of the tutoring agent. Thus, the tutoring agent may incorrectly assess the student because the tutoring agent incorrectly understands the response of the student. Additionally, since the tutoring agent is a programmed agent, the output provided by the tutoring agent may be ambiguous or difficult to understand by the student. Thus, the response provided by the student may be a response that does not conform to the expected response because the student does not understand the question or statement posed by the tutoring agent.

Another problem with conventional tutoring agents is that the tutoring agent is programmed to provide certain output in a particular order. For example, the tutoring agent may be programmed with a particular question that is used to evaluate the student's understanding of a particular topic. The tutoring agent is also provided with a reference answer that identifies a correct answer or answer that is used to identify whether the student has a complete and accurate understanding of the topic. The tutoring agent is also programmed with certain assertions and hints related to the topic. With this information the tutoring agent can generate output responsive to a user's input. For example, if the student provides a partial answer or requests additional information, the tutoring agent can use the identified hints or assertions to provide output that may lead the student to the correct answer. These hints or assertions may be provided to the user in a particular order or may be provided when a particular response is provided by the user, for example, if the user provides a partial response, the provided hint may be directed at the portion of the answer that the user is missing. However, this programmed order may not be the best ordering, or may not be appropriate for all users. Similarly, some programmed questions may be too difficult (e.g., hard to understand, too complex, etc.), too easy, may result in responses that are difficult for the agent to understand, or the like.

To improve the tutoring agent, for example, the ability to understand student input, the ordering of questions, the complexity of questions, and the like, conventional techniques rely on a tutoring agent developer to either identify a problem area or a user of the agent to provide direct feedback to the developer. Even upon review by a developer, it may be difficult to determine the exact problem. For example, the fact that students generally answer a question incorrectly may be indicative of the question being too difficult, the question being asked out-of-order, the question being confusing, or the like. However, just upon review of the question or the input used to generate the question, the developer may be unable to identify which of the causes is resulting in the low rate of correct answers. Therefore, because the developer is unable to identify a root cause, the developer may not be able to provide a correction that fixes the root cause.

Accordingly, the techniques and systems as described herein provide a system and technique for providing a recommendation for improvement of a tutoring agent using transcripts of interactions between the tutoring agent and students. The system may receive a plurality of transcripts that correspond to interactions between one or more students and a tutoring agent. From the transcripts the system may identify conversational patterns by parsing the transcripts and identifying exchanges between the tutoring agent and the student. These exchanges may include a single conversational turn by the tutoring agent and a response conversational turn by the student. In other words, the exchange may include an output from the tutoring agent and a response by the student. Each of the responses for each of the tutoring agent and the student may be classified into a response type, for example, a question, a hint, an answer, or the like. The patterns and classified response types identify how the tutoring agent is responding to the student and how the student is responding to the tutoring agent. This information may provide an indication of misunderstanding by either the agent or the student, a mis-ordering of questions, an unexpected difficulty of questions or hints, or the like. Thus, by classifying the responses and identifying patterns in the responses, the system can determine a possible improvement to the tutoring system and provide the possible improvement to the developer of the tutoring agent.

Such a system provides a technical improvement over current systems for development of tutoring agents. The described systems and methods provide a technique that can mine information from a plurality of transcripts corresponding to interactions between users and the tutoring agent. The described system can then use the mined information to identify patterns in responses provided by students to particular questions posed by a tutoring agent. These identified patterns can then be used to identify a particular area for improvement of the tutoring agent and provide a recommendation for improvement to the agent developer. Thus, the systems and methods provide a technique that allows for the automatic identification of issues related to a tutoring agent based upon transcripts between the agent and students. Therefore, the developer does not have to rely on direct feedback from students or users of the agent in order to identify problems with the agent. Additionally, the system can identify the root cause of the issues, rather than merely identifying that an issue is occurring, as with conventional systems. Thus, the developer can take steps to correct the underlying issue rather than making changes that may be unnecessary and ultimately fail to correct the problem. Therefore, the described systems and methods provide a technique for developing tutoring agents that is more efficient and accurate and that results in a tutoring agent that is more user-friendly, more intuitive, and more similar to a human tutor than those systems provided using conventional techniques.

Figure 2:
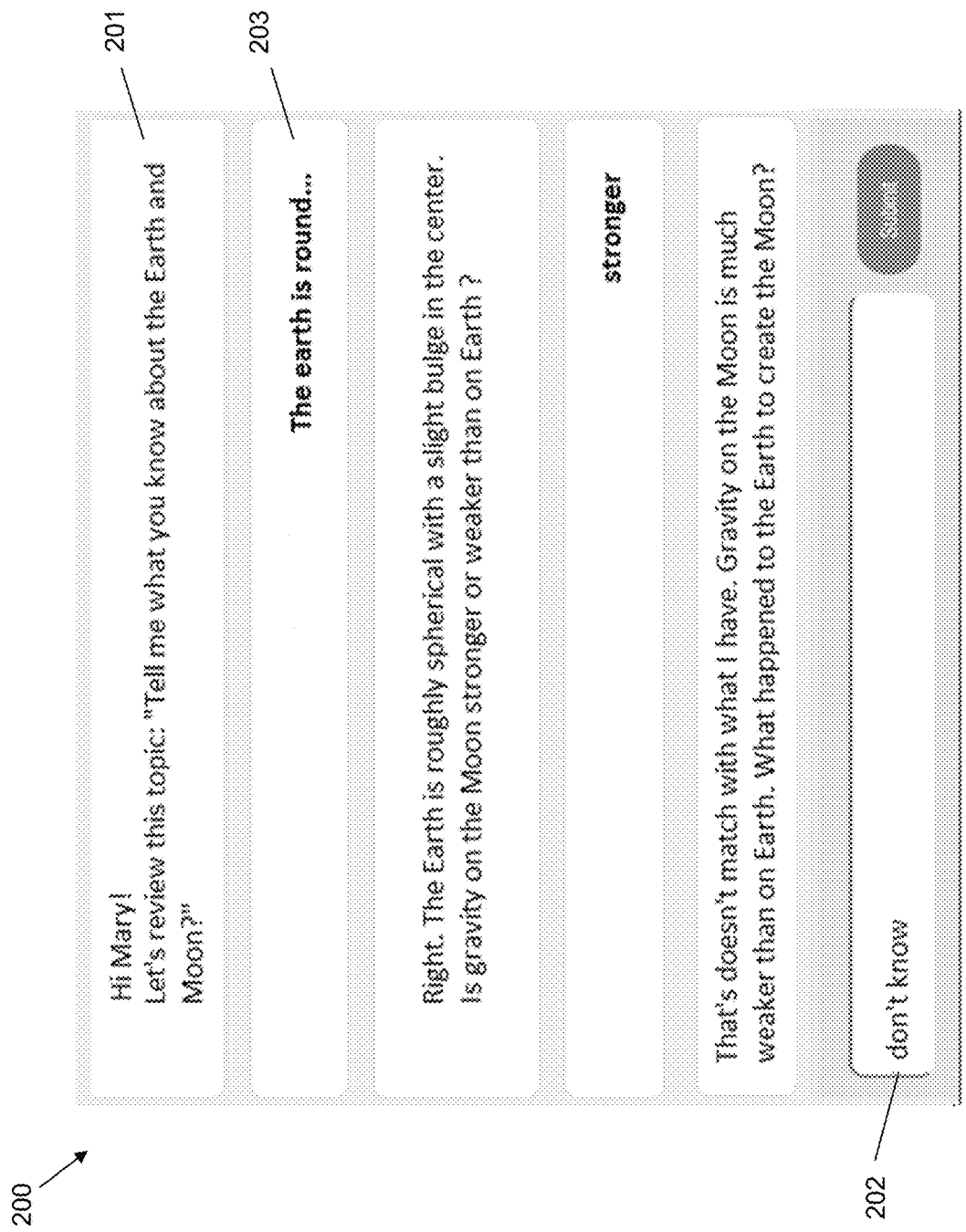
FIG. 2 illustrates an example tutoring agent user interface.

FIG. 1 illustrates a method for providing a recommendation for improvement of a tutoring agent using transcripts of interactions between the tutoring agent and students. At 101 the system may receive a plurality of transcripts that include interactions between a student and a tutoring agent. A tutoring agent may include a conversational agent that assists one or more students in learning a topic. For example, a student may access a user interface associated with a tutoring agent, for example, as illustrated in FIG. 2 at 200. Using this interface, the tutoring agent may provide output, for example, as shown at 201, that the student can then respond to using the free form text entry box, for example, as shown at 202. The student response is then provided to the tutoring agent and displayed within the user interface, for example, as shown at 203. From the input provided by the student, the tutoring agent can evaluate the student's understanding of the topic. Based upon this assessment the tutoring agent may provide additional output to correct a misunderstanding by the student, provide additional information not identified by the student, confirm a response by the student, address a question by the student, or the like.

Figure 3:
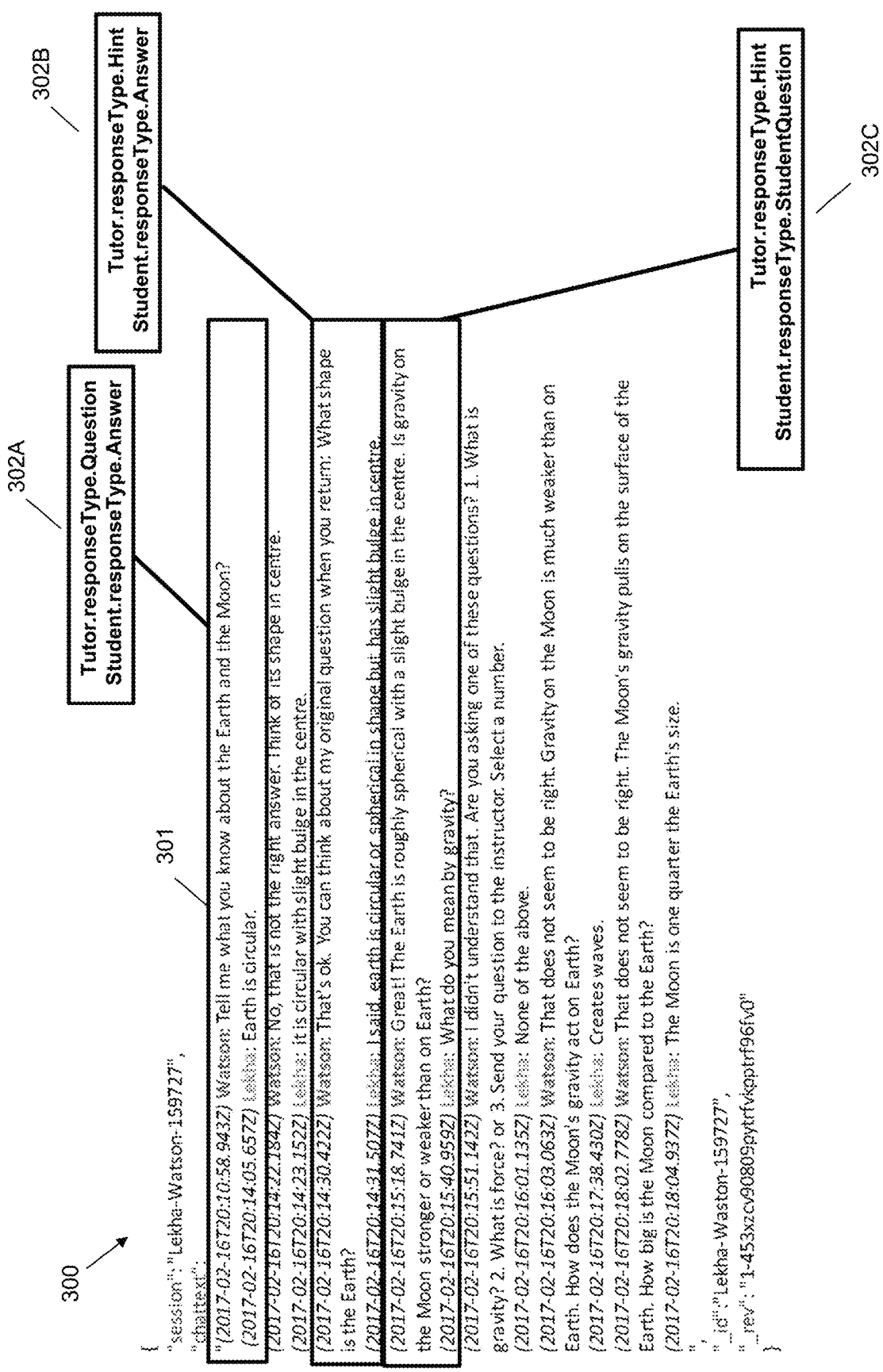
FIG. 3 illustrates an example transaction transcript.

Each of these interactions may be captured and stored as a transcript, or other transaction or interaction log, that details the responses or output provided by the tutoring agent and the student. In other words, the transcript may be an interaction log that details the exchanges between the tutoring agent and the student. For example, the transcript may include a transcription of each of the responses provided by each of the tutoring agent and the student within a single interaction. FIG. 3 illustrates an example transcript 300. This transcript corresponds to a single interaction or session between a student and a tutoring agent regarding a single topic or concept. A single interaction is also referred to as a transaction. As illustrated in FIG. 3, each of the responses or outputs provided by the tutoring agent and the student are indicated. The transcript may also include additional information, for example, the date and time of provision of a response or output, an identifier associated with the tutoring agent and/or student, a transaction identifier, a mode of communication (e.g., text, voice, etc.), and the like.

The example illustrated in FIG. 3 illustrates a single interaction between the tutoring agent and a single student regarding a single topic. However, the transcript may also include multiple interactions between a single student and the tutoring agent, multiple interactions between the tutoring agent and multiple students, or the like. For example, the system may record, in a single transcript, all interactions between a student and a tutoring agent that occur on a particular day or all interactions that are related to a particular topic. As another example, the system may record, in a single transcript, all interactions between any student and the tutoring agent related to a particular topic or class. The transcripts may be created and/or stored at a data storage location associated with the student's local device, a data storage location associated with the tutoring agent system, or another data storage location. Thus, receiving the plurality of transcripts may include receiving the transcripts at the system, accessing a storage location including the stored transcripts, or otherwise obtaining the transcripts.

The plurality of transcripts may be all transcripts associated with a particular student, a tutoring agent, or the like. Additionally or alternatively, the transcripts may be grouped based upon a particular characteristic of the topic, student, agent, or the like. Characteristics of the topic may include a particular sub-topic of an overarching topic, a topic corresponding to a particular classroom session, a topic corresponding to a book chapter, or the like. For example, the system may group all transcripts that are related to a classroom session into a single group of transcripts. Characteristics of a student may include a mastery level of students, a geographic location of students, historical grades of students, attributes of the students, or the like. For example, the system may group the transcripts into groups based upon how well the student is performing in the class. Other characteristics are possible and contemplated. Accordingly, the plurality of transcripts may include all of the transcripts of a particular group. This grouping may assist the system in determining that the programming of the agent results in issues for a particular group, while other groups may not be affected by the issue.

At 102 the system may identify conversational patterns within the plurality of transcripts. The conversational patterns may indicate a level of understanding between the tutoring agent and the student. Particularly, the conversational patterns may identify how well the student understands the questions or content posed by the tutoring agent and how well the tutoring agent understands the responses provided by the student. In other words, the conversational patterns may identify whether there is a break-down in the communication between the tutoring agent and the student. To identify the conversational patterns the system may parse and analyze the transcripts. In this analysis the system may identify a single exchange between the tutoring agent and the student including a conversational turn by the tutoring agent and a conversational turn by the student. This single exchange may also be referred to as an atom. While the atom will typically include a turn or output by the tutoring agent followed by a response by the student, the atom may be a response or input provided by the student and then a response by the tutoring agent. Thus, the atom is a pair of responses provided by the tutoring agent and the student, in any order, in sequence, meaning one is provided in response to the other. In FIG. 3 some example atoms or exchanges are highlighted and boxed, for example, at 301. In these examples, the tutoring agent provides the first output followed by a response by the student.

Once the system has identified the atoms, the systems may classify each response within the atom into a response type. The response types may identify what kind of response has been provided by each of the agent and the student, for example, a question, hint, assertion, answer, student question, or the like. As an example, FIG. 3 illustrates different response type classifications for the atoms at 302A, 302B, and 302C. At 302A the system has identified that the agent response is a question posed to the student. The student response type is then an answer to the question. At 302B the agent response has been classified as a hint and the student response has been classified as an answer. At 302C the agent response has been classified as a hint and the student response has been classified as a student question.

In classifying the response type the system may access the input provided to the tutoring agent system. This input may include the primary question, a reference answer that identifies the parts of an answer that would be considered complete and accurate, assertions, hints, and the like. The agent may present the primary question to a student. As the student responds the system may compare the student response to the components of the reference answer. If the agent determines that the response is incomplete or inaccurate, the system may use the assertions and/or hints to generate responses that can be provided to the student to assist the student in identifying or articulating all the parts or components of the reference answer. Therefore, the system may use the designations of the input to classify the response of the agent. For example, if the agent response includes information from one of the assertions or hints, the system may use this label to classify that response as a hint response type.

From the response types the system may identify the conversational pattern that corresponds to the atom. Example conversational patterns corresponding to an atom level analysis include a tutor question followed by a student question, a tutor question followed by an incorrect student response, a tutor hint followed by a partially correct student answer, a student response taking a long time to provide, a student response followed by a tutor question, and the like.

The conversational pattern(s) may also be identified on a transaction level. The transaction level may identify the conversational pattern that occurs over a plurality of atoms within the transaction. The transaction level analysis may include identifying a trajectory of the atoms or an occurrence of a sequence of atoms. The trajectory may be extracted by varying the window size around the atoms, for example, by identifying how many atoms should be analyzed within a particular sequence. The trajectory or transaction analysis may assist in understanding dependencies or relatedness of concepts. The transaction analysis may indicate that a series of atoms are indicative of a particular conversational pattern. For example, some conversational patterns corresponding to a transaction level analysis may include a student incorrectly answering one question followed by an incorrect response to a second question, a student correctly answering one question followed by an incorrect response to another question, a particular learning path, a length of a student response to a series of questions, and the like.

Other conversational patterns may be identified, for example, based upon the grouping of transcripts, the grouping of atoms, the grouping of transactions, or the like. Example conversational patterns identified based upon groupings or other factors may include a student having a high mastery answers a question correctly, while a student having a low mastery answers the same question incorrectly, a question frequently asked by students, and the like.

At 103 the system may determine whether a possible improvement to the tutoring agent can be determined from the identified conversational patterns. The conversational patterns and classified response types may help to identify problems with the tutoring agent or may assist in identifying possible areas of improvement to the tutoring agent. The identification of areas of improvement may be based upon conversational patterns identified from an analysis at the atom level, at the transaction level, or a combination thereof. The identified conversational patterns may be indicative of different problems with the tutoring agent system, for example, that the tutoring agent does not understand the conversational turn provided by the student, the student does not understand the conversational turn provided by the tutoring agent, the questions are too difficult, the order of questions/hints presented is incorrect, or the like. It should be understood that possible improvements may be based upon a large collection of transcripts. Thus, the system may not identify an area for improvement based upon a single exchange between the tutoring agent and a single student. Rather, the system may identify that a conversational pattern consistently or frequently occurs when certain conditions are met, for example, a student mastery is of a certain level, particular topics or content are being presented, a certain question or hint is presented by the tutoring agent, or the like. In other words, the system may attempt to identify a common characteristic between exchanges that have a particular conversational pattern so that the system can identify a possible underlying cause.

Different areas for improvement can be identified based upon the conversational patterns identified, for example, changing an ordering of questions presented by the tutoring agent, rephrasing a question presented by the tutoring agent, retraining the tutoring agent with respect to a response of students, modifying a difficulty level of a question presented by the tutoring agent, or the like. As an example, where the conversational pattern is a tutor question followed by a student question, the system may identify that the tutor question is unclear, thereby identifying an area for improvement as rephrasing the tutor question. As another example, a tutor question followed by an incorrect student response may indicate that the tutor is classifying correct responses as incorrect or that the question is unclear. The system may then identify an area for improvement as evaluating the response classifier and retraining the agent using more training data or rephrasing the question. As another example, a student incorrectly answering a first and second question and then also incorrectly answering a third subsequent question may indicate that the questions are dependent on each. The system may then identify an area for improvement as changing the dialog flow where a hint question for a subsequent question is replaced by a prompt when the first two questions are answered incorrectly.

As another example, a student having a low mastery of a particular topic may answer certain questions incorrectly, thereby indicating that the question(s) has a dependency on the topic. Thus, the area of improvement may include recommending that the student read the topic before asking the question(s) that are dependent on that topic. As another example, the system may identify that students having a particular mastery follow a particular question path. Therefore, the system may recommend that the dialog flow for students of a particular mastery be changed to reduce the number of turns provided by the tutoring agent. Hint questions followed by students providing partially correct questions may indicate that the students are able to provide only partial answers based upon the hints, and, therefore, the assertion or hint should be rephrased. A similar question asked by many students may indicate that the system should generate a question/answer pair for the frequently asked question. Hints or assertions resulting in a high number of incorrect responses, even by students having a high mastery, may indicate that the question is too difficult or that content should be provided before asking the question. Student responses followed by tutor questions may indicate that the tutor is unable to understand student responses and, therefore, the dialog classification should be improved or modified to allow the tutor to better understand the response. A student taking a long time to answer a question presented by the tutor may indicate that the question is difficult, and, therefore the question should be rephrased or content should be provided before asking the question. It should be understood that these conversational patterns and insights or areas for improvement are merely examples and other conversational patterns and other areas for improvement may be identified.

If the system identifies that a possible area for improvement has not been determined at 103, the system may take no further action at 105. If, however, the system identifies a possible area for improvement at 103, the system may notify, or otherwise provide an indication to, a developer of the tutoring agent of the possible area for improvement at 104. Notifying the developer may include sending a report to the agent developer indicating the area for improvement. Notifying the developer may also include providing a pop-up window, sending an alert, making a note in the agent system, or the like. The notification may also include additional information, for example, the exchanges that the system has used to identify the area for improvement, a chart or report identifying how many exchanges were used to identify the area for improvement, identification of students included in the analysis, or the like.

Thus, the described system and method provides a technique for automatically identifying areas for improvement in the development of a tutoring agent. The system may use transcripts of interactions between students and a tutoring agent to identify conversational patterns that may be indicative of problems or issues with the tutoring agent. This information may then be used to identify a particular area for improvement and a possible suggestion for addressing the identified issue. Accordingly, the developer may be apprised of issues with the tutoring agent based upon an automatic analysis of transcripts that is not provided using conventional techniques, thereby assisting in the development of the tutoring agent in an accurate and efficient manner, resulting in a tutoring agent that is more user-friendly and more human-like than traditional tutoring agents.

Figure 4:
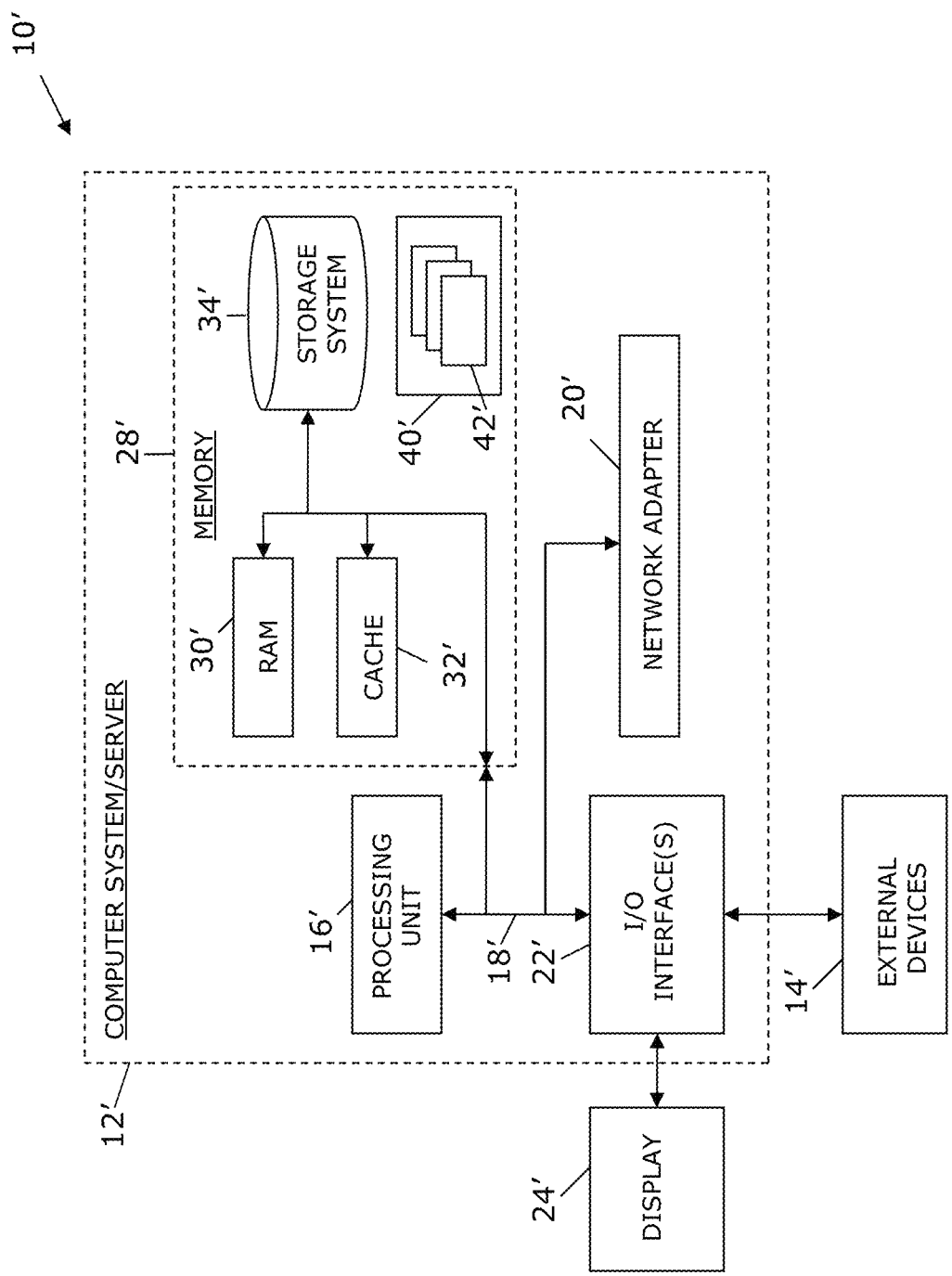
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, using a processor, a plurality of transcripts, each transcript corresponding to an interaction between a student and a computer-based tutoring agent, wherein the tutoring agent comprises a conversational agent that assists the student in learning a topic;
identifying, using the processor and by parsing the plurality of transcripts, conversational patterns within the plurality of transcripts, the identified conversational patterns indicating a level of understanding regarding the interaction between the tutoring agent and the student, wherein the identifying comprises (i) identifying atoms within the plurality of transcripts, wherein each atom corresponds to an exchange between the tutoring agent and the student, the exchange comprising a conversational turn by each of the tutoring agent and the student and (ii) classifying each of the conversational turns into a response type, wherein the classifying comprises classifying a response in the exchange based upon a designation of an input in the exchange;
determining, using the processor and based upon the identified conversational patterns, a possible improvement to the tutoring agent, wherein the possible improvement is determined based upon the classified response types of each of (i) the tutoring agent and (ii) the student; and
notifying, using the processor, a developer of the tutoring agent of the identified possible improvement.

2. The method of claim 1, wherein the identified conversational pattern indicates the tutoring agent does not understand the conversational turn by the student.

3. The method of claim 1, wherein the identified conversational pattern indicates the student does not understand the conversational turn by the tutoring agent.

4. The method of claim 1, wherein the determining a possible improvement is based upon a trajectory of the conversation between the tutoring agent and the student, the trajectory identified from the interaction.

5. The method of claim 1, wherein the identifying conversational patterns comprises grouping exchanges from the plurality of transcripts into groups corresponding to particular content.

6. The method of claim 5, wherein the determining a possible improvement is based upon analysis of a single group of exchanges corresponding to particular content.

7. The method of claim 1, comprising grouping the transcripts into groups of transcripts corresponding to students having a similar characteristic.

8. The method of claim 7, wherein the determining a possible improvement is based upon an analysis of exchanges corresponding to a group of students having a similar characteristic.

9. The method of claim 1, wherein the determining a possible improvement comprises identifying when the length of time for response by a student to an output provided by the tutoring agent is greater than a predetermined threshold.

10. The method of claim 1, wherein the possible improvement comprises at least one improvement selected from the group consisting of: changing the order of questions presented by the tutoring agent, rephrasing a question presented by the tutoring agent, retraining the tutoring agent with respect to a response of students, and modifying a difficulty level of a question presented by the tutoring agent.

11. An apparatus, comprising:
at least one processor; and
a computer readable storage medium having computer readable program code embodied therewith and executable by the at least one processor, the computer readable program code comprising:
computer readable program code configured to receive a plurality of transcripts, each transcript corresponding to an interaction between a student and a computer-based tutoring agent, wherein the tutoring agent comprises a conversational agent that assists the student in learning a topic;
computer readable program code configured to identify, by parsing the plurality of transcripts, conversational patterns within the plurality of transcripts, the identified conversational patterns indicating a level of understanding regarding the interaction between the tutoring agent and the student, wherein the identifying comprises (i) identifying atoms within the plurality of transcripts, wherein each atom corresponds to an exchange between the tutoring agent and the student, the exchange comprising a conversational turn by each of the tutoring agent and the student and (ii) classifying each of the conversational turns into a response type, wherein the classifying comprises classifying a response in the exchange based upon a designation of an input in the exchange;

computer readable program code configured to determine, based upon the identified conversational patterns, a possible improvement to the tutoring agent, wherein the possible improvement is determined based upon the classified response types of each of (i) the tutoring agent and (ii) the student; and computer readable program code configured to notify a developer of the tutoring agent of the identified possible improvement.

12. A computer program product, comprising:

a computer readable storage medium having computer readable program code embodied therewith, the computer readable program code executable by a processor and comprising:

computer readable program code configured to receive a plurality of transcripts, each transcript corresponding to an interaction between a student and a computer-based tutoring agent, wherein the tutoring agent comprises a conversational agent that assists the student in learning a topic;

computer readable program code configured to identify, by parsing the plurality of transcripts, conversational patterns within the plurality of transcripts, the identified conversational patterns indicating a level of understanding regarding the interaction between the tutoring agent and the student, wherein the identifying comprises (i) identifying atoms within the plurality of transcripts, wherein each atom corresponds to an exchange between the tutoring agent and the student, the exchange comprising a conversational turn by each of the tutoring agent and the student and (ii) classifying each of the conversational turns into a response type, wherein the classifying comprises classifying a response in the exchange based upon a designation of an input in the exchange;

computer readable program code configured to determine, based upon the identified conversational patterns, a possible improvement to the tutoring agent, wherein the possible improvement is determined based upon the classified response types of each of (i) the tutoring agent and (ii) the student; and computer readable program code configured to notify a developer of the tutoring agent of the identified possible improvement.

13. The computer program product of claim 12, wherein the identified conversational pattern indicates the tutoring agent does not understand the conversational turn by the student.

14. The computer program product of claim 12, wherein the identified conversational pattern indicates the student does not understand the conversational turn by the tutoring agent.

15. The computer program product of claim 12, wherein the determining a possible improvement is based upon a trajectory of the conversation between the tutoring agent and the student, the trajectory identified from the interaction.

16. The computer program product of claim 12, wherein the identifying conversational patterns comprises grouping exchanges from the plurality of transcripts into groups corresponding to particular content and wherein the determining a possible improvement is based upon analysis of a single group of exchanges corresponding to particular content.

17. The computer program product of claim 12, comprising grouping the transcripts into groups of transcripts corresponding to students having a similar characteristic.

18. The computer program product of claim 17, wherein the determining a possible improvement is based upon an analysis of exchanges corresponding to a group of students having a similar characteristic.

19. The computer program product of claim 12, wherein the determining a possible improvement comprises identifying when the length of time for response by a student to an output provided by the tutoring agent is greater than a predetermined threshold.

* * * * *